United States Patent
Kim et al.

(10) Patent No.: US 8,356,228 B2
(45) Date of Patent: Jan. 15, 2013

(54) APPARATUS AND METHOD FOR REDUCING POWER CONSUMPTION IN A MOBILE COMMUNICATION SYSTEM

(75) Inventors: Yong-Chan Kim, Seoul (KR); Il-Ho Lee, Hwaseong-si (KR)

(73) Assignee: Samsung Electronics Co., Ltd (KR)

( * ) Notice: Subject to any disclaimer, the term of this patent is extended or adjusted under 35 U.S.C. 154(b) by 319 days.

(21) Appl. No.: 12/681,732

(22) PCT Filed: Oct. 2, 2008

(86) PCT No.: PCT/KR2008/005812
§ 371 (c)(1),
(2), (4) Date: Apr. 5, 2010

(87) PCT Pub. No.: WO2009/045060
PCT Pub. Date: Apr. 9, 2009

(65) Prior Publication Data
US 2010/0229072 A1    Sep. 9, 2010

(30) Foreign Application Priority Data
Oct. 5, 2007   (KR) .................. 10-2007-0100322

(51) Int. Cl.
*H03M 13/00* (2006.01)
(52) U.S. Cl. .................. 714/752; 714/786; 714/799
(58) Field of Classification Search .................. 714/752, 714/786, 799
See application file for complete search history.

(56) References Cited

U.S. PATENT DOCUMENTS

| | | | |
|---|---|---|---|
| 6,988,236 B2 * | 1/2006 | Ptasinski et al. | 714/758 |
| 7,454,683 B2 * | 11/2008 | Vesma et al. | 714/752 |
| 7,525,993 B2 * | 4/2009 | Yousef | 370/473 |
| 7,555,661 B2 * | 6/2009 | Luu | 713/320 |
| 7,584,495 B2 * | 9/2009 | Hannuksela et al. | 725/101 |
| 7,644,343 B2 * | 1/2010 | Gubbi et al. | 714/776 |
| 7,747,930 B2 * | 6/2010 | Pekonen et al. | 714/784 |
| 7,826,536 B2 * | 11/2010 | Hannuksela et al. | 375/240.26 |
| 7,940,798 B2 * | 5/2011 | Puputti et al. | 370/471 |
| 2007/0019578 A1 | 1/2007 | Meiri | |

FOREIGN PATENT DOCUMENTS

| | | |
|---|---|---|
| KR | 1020060112159 A | 10/2006 |
| KR | 1020070004371 A | 1/2007 |
| KR | 1020070081907 A | 8/2007 |
| KR | 1020080008849 | 1/2008 |

* cited by examiner

*Primary Examiner* — Esaw Abraham
(74) *Attorney, Agent, or Firm* — The Farrell Law Firm, P.C.

(57) ABSTRACT

An apparatus and method for reducing power consumption in a mobile communication system are provided. The apparatus includes a time slicing processor. When a frame border of the last section for determining a burst reception end time is not detected during a burst reception operation, the time slicing processor receives a burst enough to restore the whole MPE-FEC frame to the former state or receives an early burst reception end request for notifying that it is impossible to restore the whole MPE-FEC frame to the former state, and terminates the burst reception process.

16 Claims, 9 Drawing Sheets

[Fig. 1]
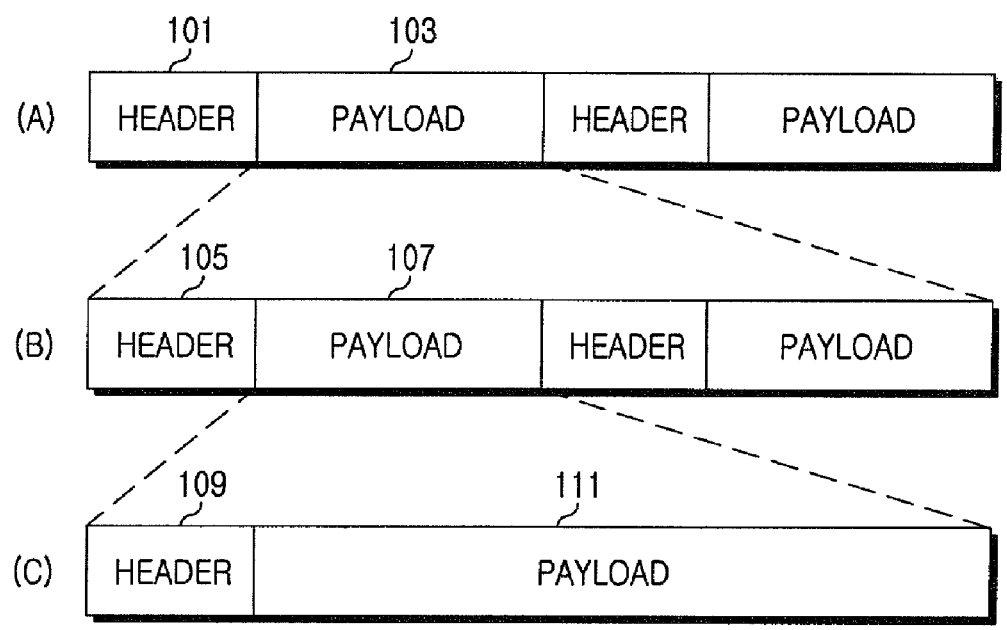
(PRIOR ART)

[Fig. 2]
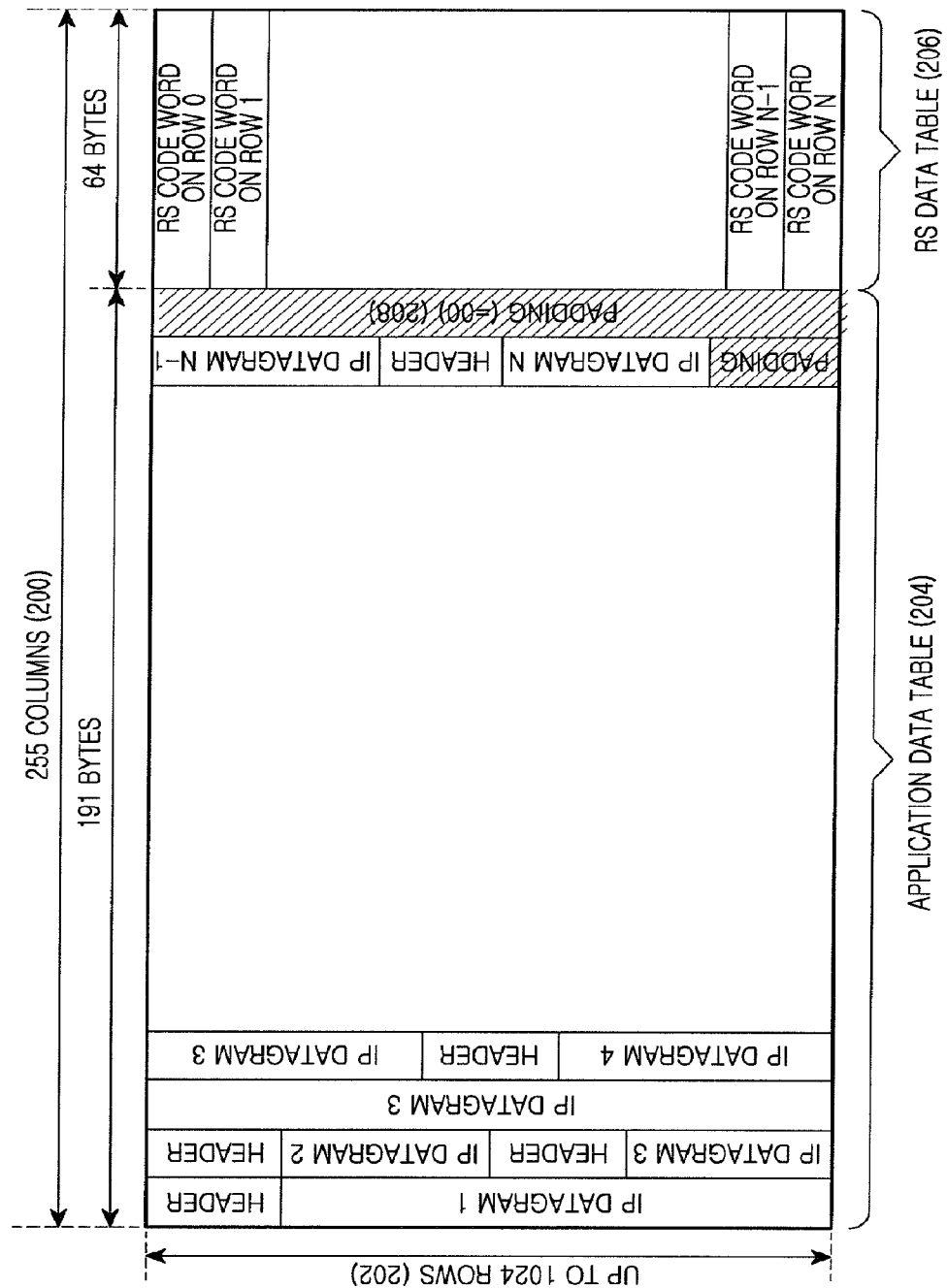
(PRIOR ART)

[Fig. 3]
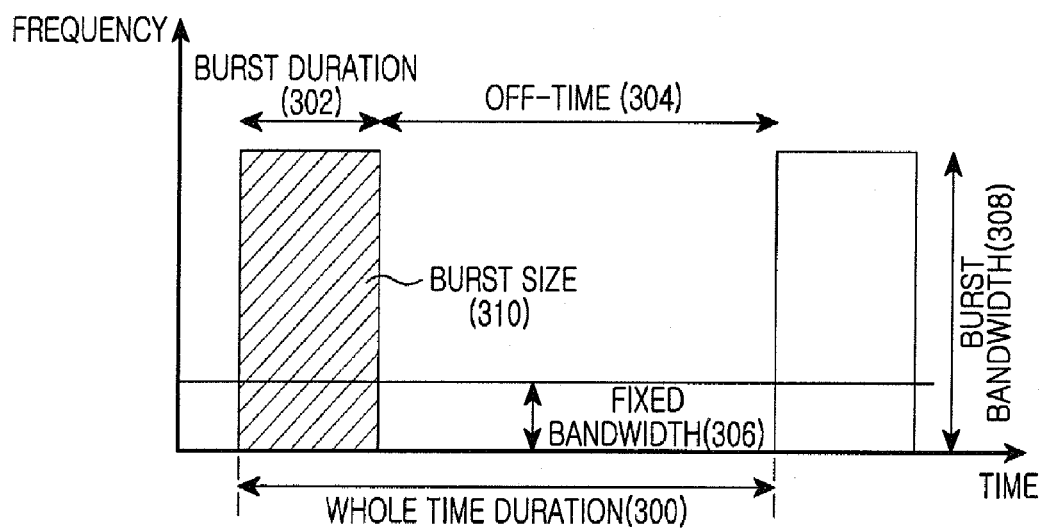
(PRIOR ART)

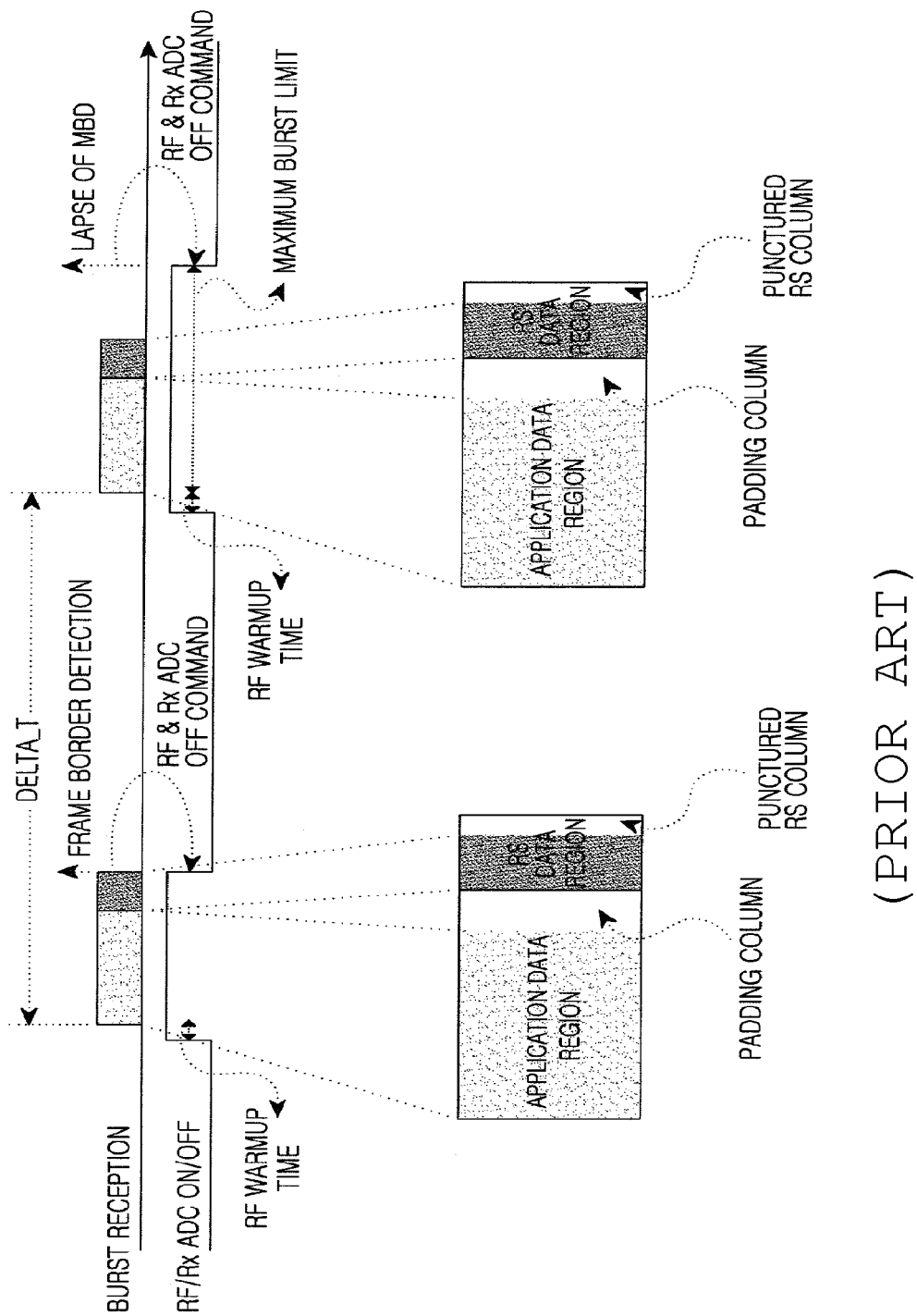
[Fig. 4]
(PRIOR ART)

[Fig. 5]
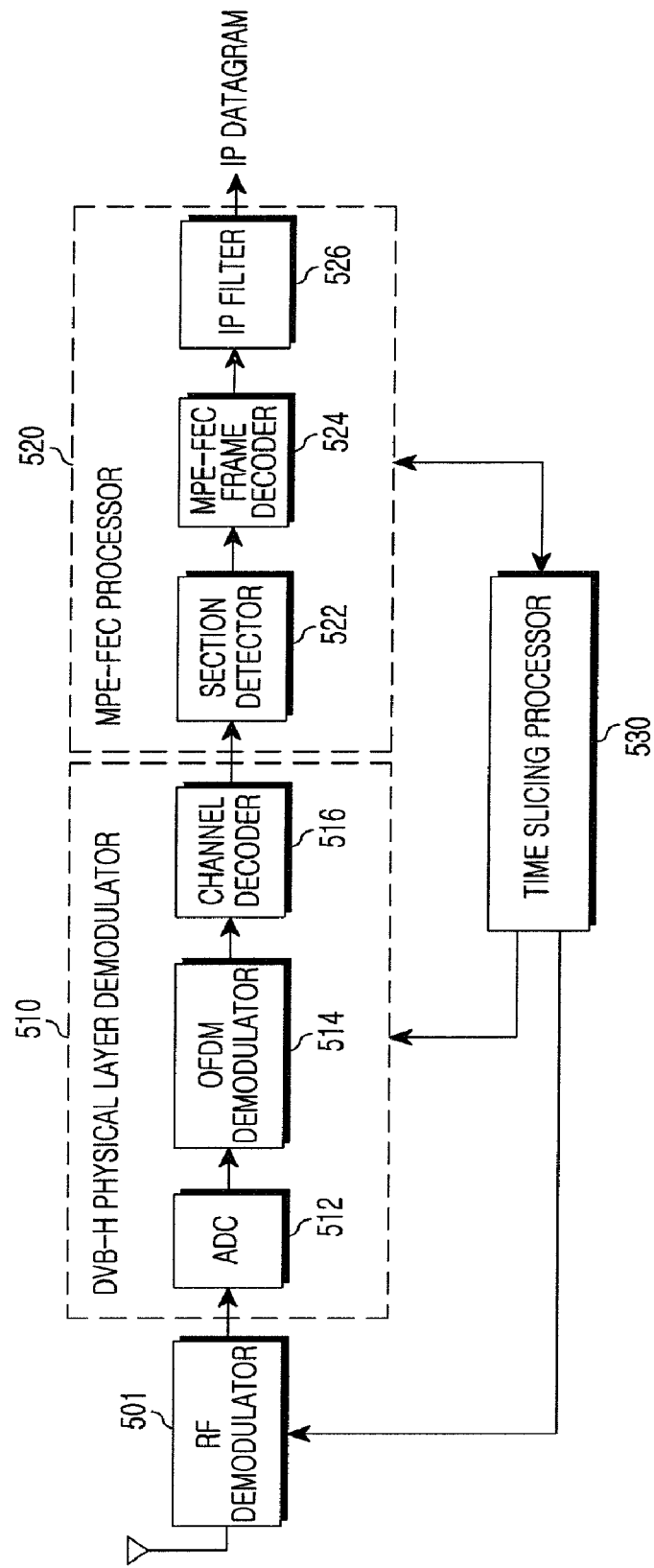

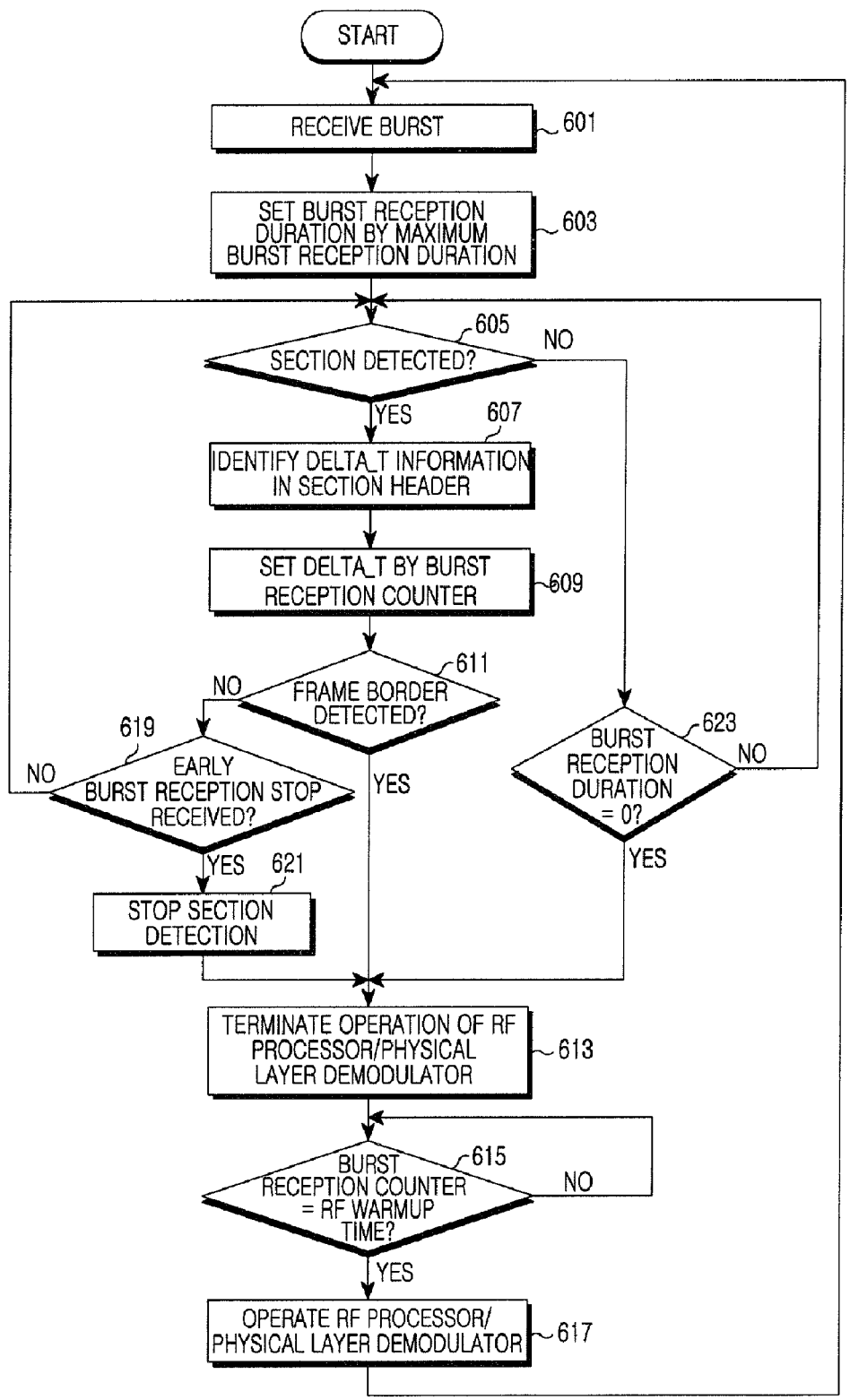
[Fig. 6]

[Fig. 7]
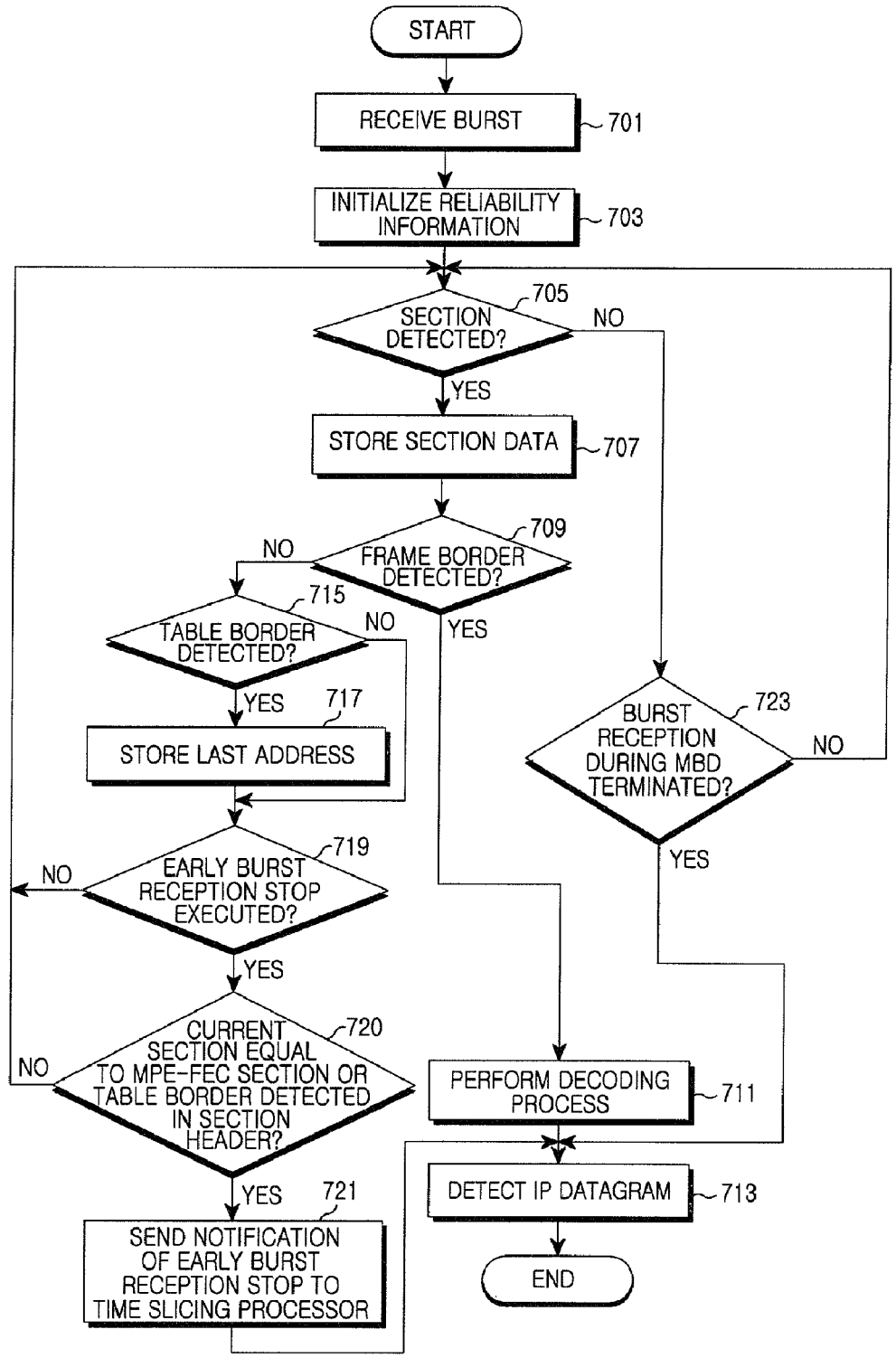

[Fig. 8]
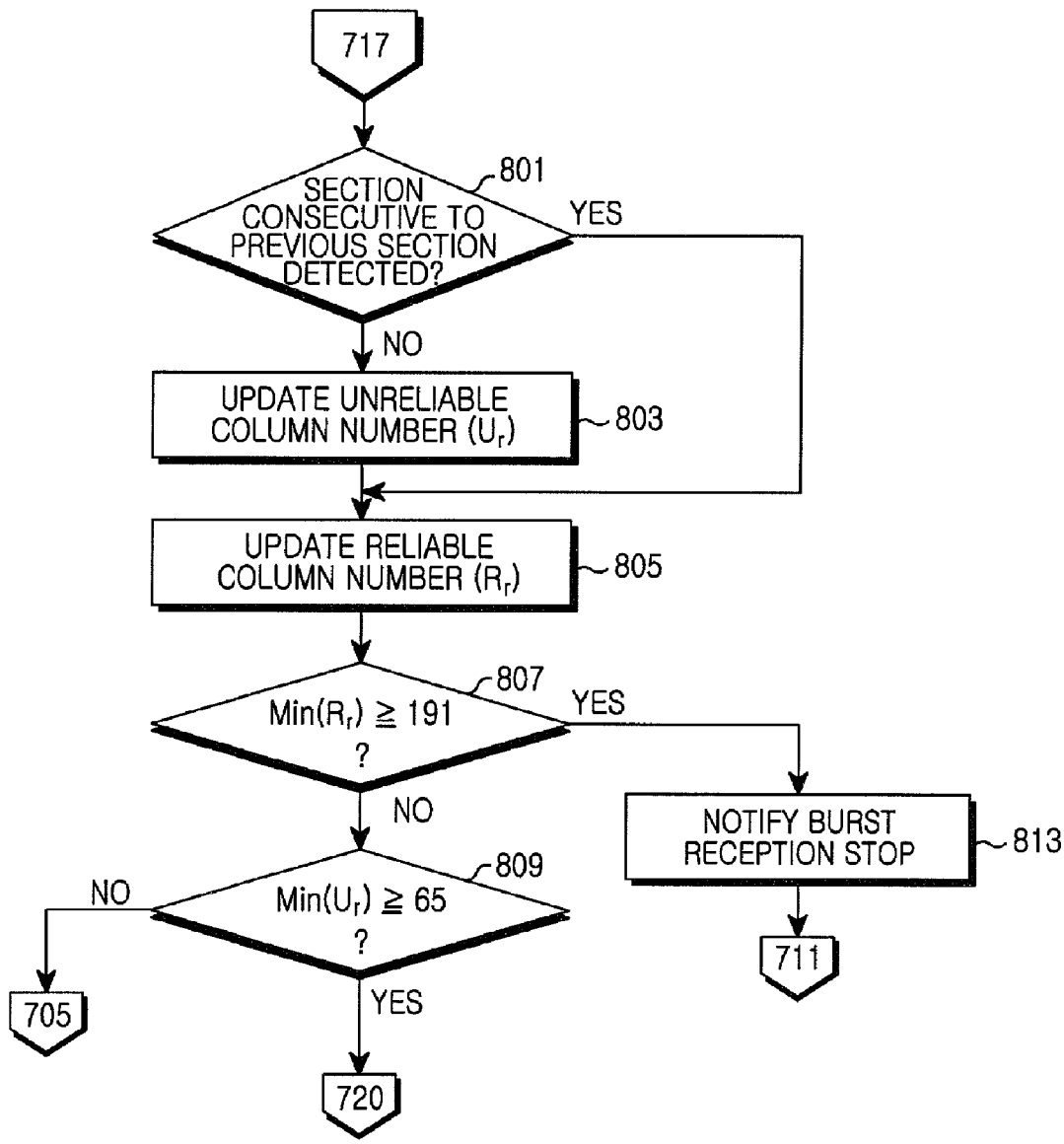

[Fig. 9]
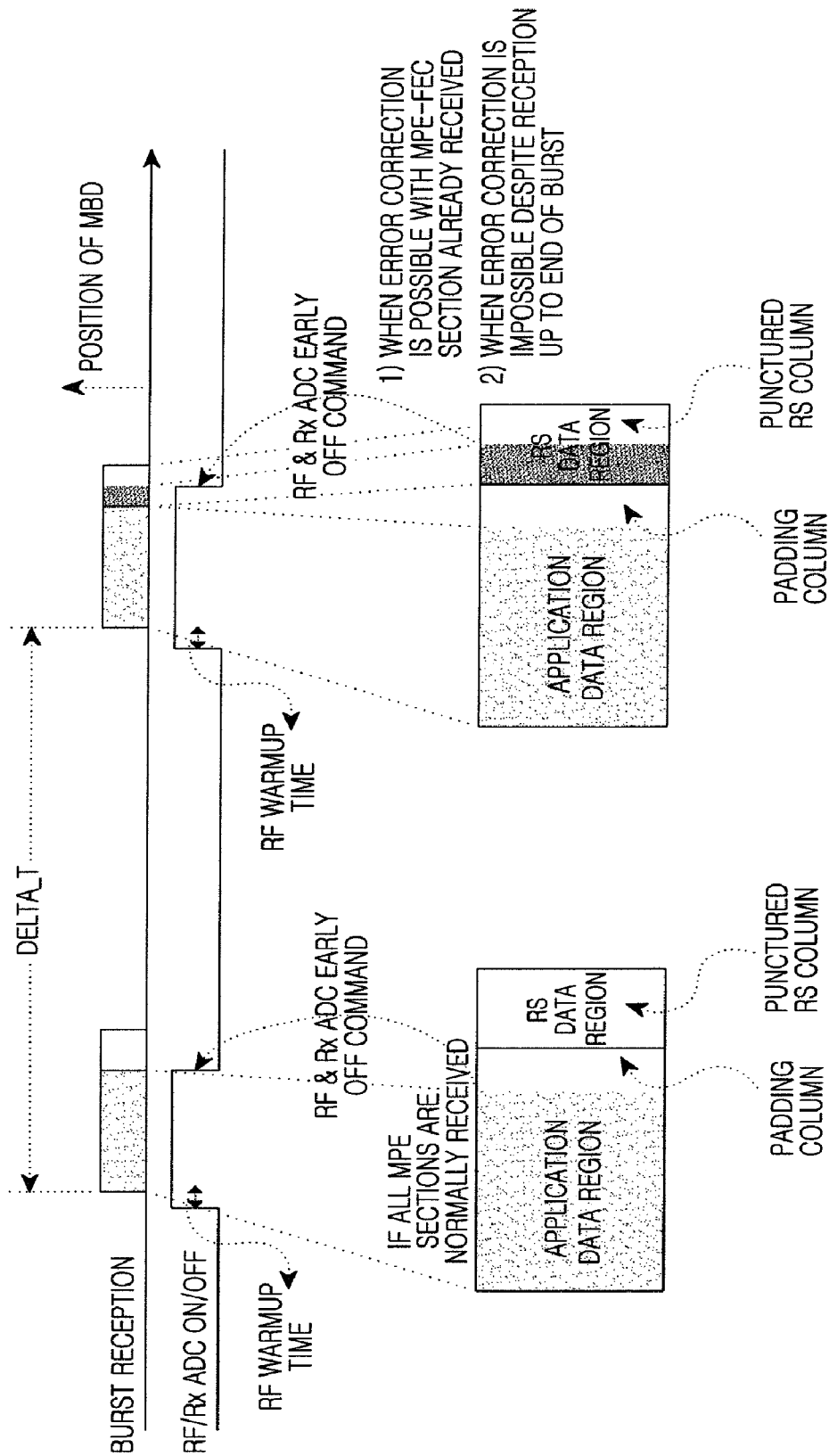

APPARATUS AND METHOD FOR REDUCING POWER CONSUMPTION IN A MOBILE COMMUNICATION SYSTEM

TECHNICAL FIELD

The present invention relates generally to an apparatus and method for receiving a digital broadcasting service. More particularly, the present invention relates to an apparatus and method for reducing power consumption of a receiver that receives a digital broadcasting service.

BACKGROUND ART

Generally, broadcasting services are provided to all users with terminals. Theses broadcasting services are classified into an audio broadcasting service such as radio broadcasting service for providing only audio, a video-centered broadcasting service such as television for providing audio and video services, and a multimedia broadcasting service including audio, video, and data services. The broadcasting services are based on an analog system and are currently evolving into digital broadcasting with the rapid development of various technologies.

Moreover, the broadcasting services are being developed in various systems such as a multimedia service system of a wired network for providing data of high image quality at high rates by wire, a system for providing a multimedia service using an artificial satellite, and a system that simultaneously uses a wire and an artificial satellite, without use of a conventional system for providing a service on the basis of a transmission tower.

A Digital Multimedia Broadcasting (DMB) system, as one of the above-described systems, is being actively commercialized. This DMB system has been derived from Digital Audio Broadcasting (DAB) and is based on European Research Coordination Agency (Eureka) project-147, serving as the technical standard of DAB in Europe.

In Europe, as the origin of the DAB technology, a group called Digital Video Broadcasting (DVB) has been organized for multimedia broadcasting services and is working to establish a separate standard for portable broadcasting services, called Digital Video Broadcasting-Handhelds (DVB-H). DVB-H is a new broadcasting standard under development by Digital Audio Broadcasting (DAB) that is a European group for digital TV broadcasting standardization, following satellite digital TV (DVB-S), digital cable TV (DVB-C), and terrestrial digital TV (DVB-T).

With the determination that voluminous multimedia contents such as movies or broadcast dramas cannot be implemented through portable terminals in accordance with $3^{rd}$ mobile communication (Universal Mobile Telecommunication System (UMTS) or International Mobile Telecommunications-2000 (IMT-2000)), terrestrial digital TV, and DAB, the DAB group has promoted standardization named 'DVB-eXtension (DVB-X)', which was later renamed DVB-H to clearly indicate 'portable broadcasting'.

DVB-H is designed to reinforce mobility in the European digital TV transmission standard DVB-T and is an extension of DVB-T considering low power, mobility, and portability of mobile terminals or portable video devices. DVB-H systems support additional Error Correction Coding (ECC) for layer-3 Internet Protocol (IP) packets. This additional ECC process is called Multi Protocol Encapsulation—Forward Error Correction (MPE-FEC).

In DVB-H systems, broadcasting data is composed of IP datagrams and an MPE-FEC frame is formed by performing Reed-Solomon (RS) coding on the IP datagram. Thus, the MPE-FEC frame is composed of an MPE section carrying the IP datagram and an MPE-FEC section carrying parity data resulting from the RS encoding. The MPE section and the MPE-FEC section are transmitted through a payload of a TransportStream (TS) packet, which is a transport unit of the DVB-H system, over a physical layer.

FIG. 1 illustrates a data structure of a TS packet in a general DVB-H system.

FIG. 1(A) illustrates a TS packet for storing an MPE section or MPE-FEC section. The TS packet (a) may include a plurality of MPE sections or MPE-FEC sections or a single MPE section or MPE-FEC section may be transmitted through a plurality of TS packets. If a Packet Identifier (PAD) of a header 101 of the TS packet (a) indicates a packet transmitting an MPE section or MPE-FEC section, a receiving side considers an MPE section or MPE-FEC section (b) as being received through a payload 103. If the PID of the header 101 does not indicate the packet transmitting the MPE section or MPE-FEC section, it can be appreciated that Program Specific Information/Service Information (PSI/SI) is included in the payload 103.

FIG. 1(B) is a diagram illustrating an MPE section carrying an IP datagram or an MPE-FEC section carrying parity data of IP datagrams. The MPE or MPE-FEC section is composed of a header 105 and a payload 107. The header 105 includes information representing whether data contained in the payload 107 is an MPE section or MPE-FEC section. The payload 107 stores the IP datagram (c) or parity data of the IP datagram (c).

FIG. 1(C) is a diagram illustrating an IP datagram. The IP datagram represents a packet including a header 109 storing address information of an end for transmitting data and a payload 111 carrying broadcast data.

FIG. 2 is a diagram for explaining RS encoding performed by a transmitter of a general DVB-H system. The DVB-H transmitter generally performs a single RS encoding operation in each of a physical layer and a link layer. RS encoding explained in FIG. 2 is performed in the link layer.

Referring to FIG. 2, in the DVB-H system, an MPE-FEC frame can be represented by a horizontal-direction (i.e., column) size 200 and a vertical-direction (i.e., row) size 202. The column 200 is composed of 255 bytes, in which a left region of 191 bytes is an application data cable region 204 for storing an MPE section including an IP datagram 100 that is broadcast data and a right region of 64 bytes is an RS data table region 206 for storing RS data or parity data resulting from RS encoding with respect to broadcasting data stored in the application data table region 204. In contrast, the row 202 is variable up to 1024 rows.

As illustrated in FIG. 2, IP datagrams 100 of 'N' number are stored in the application data table region 204 along the vertical direction. If the application data table region 204 is not filled with the first through $N^{th}$ IP datagrams, the application data table region 204 is entirely filled up by filling up the remaining space with zero, i.e., performing zero padding 208 on the remaining space.

Once the application data table region 204 is entirely filled with the IP datagrams or zero as a result of the zero padding, RS encoding is performed in the horizontal direction, and parity data resulting from the RS encoding is filled in an RS data table region 206 as illustrated in FIG. 2.

FIG. 3 is a diagram for explaining timing slicing for transmission of a TS packet in a transmitter of a general DVB-H system. A general transmitter generally transmits data with a fixed bandwidth 306, but a transmitter of a DVB-H system transmits a burst of predetermined data as in burst size 310.

The DVB-H system supports time slicing to reduce power consumption of a receiver. Time slicing means data transmission in bursts. In other words, data to be transmitted during the entire time duration 300 is transmitted only during a burst duration 302 by increasing a data rate. Thus, the entire time duration 300 can be divided into the burst duration 302 during which data transmission occurs and an off-time duration 304 during which no data transmission occurs.

In FIG. 3, the fixed bandwidth 306 indicates an average bandwidth for general stream transmission without time slicing, and the burst bandwidth 308 indicates a burst bandwidth for transmission of the transmitter in the DVB-H system. The entire time duration 300 lasts from the start of current burst transmission until the start of next burst transmission, and is divided into the burst duration 302 during which data transmission occurs and the off-time duration 304 during which no data transmission occurs. The burst duration 302 indicates the start and end intervals of burst transmission, and the off-time duration 304 during which any transport packet is not transmitted exists between burst durations. A single MPE-FEC frame can be transmitted per burst size 310.

In the DVB-H system, a receiver receiving an MPE-FEC frame as above frequency-down converts a received broadcast signal and converts the broadcast signal into a digital signal of an OFDM symbol form. Then, the receiver restores OFDM symbols to an original TS packet. In the receiver, a time slicing processor performs a switching operation to receive a TS packet included in an MPE-FEC frame per predetermined burst duration. The receiver can identify the burst duration through delta_T information that indicates the start of a next burst duration included in a header of each MPE section and MPE-FEC section.

FIG. 4 is a timing diagram illustrating a process of processing time slicing and MPE-FEC in a receiver of a general DVB-H system.

Referring to FIG. 4, an RF demodulator turns on at a time earlier by a warmup time of the RF demodulator from a time designated by delta_T. Next, burst data is received and a section is detected, thus constituting an MPE-FEC frame. An MPE section to be stored in an application data region and an MPE-FEC section to be stored in an RS data region are transmitted with a temporal sequence. The last section has a frame border information value of '1' and, immediately after this section is detected, a time slicing controller commands 'OFF' to the RF demodulator and a DVB-H physical layer demodulator, and an MPE-FEC processor initiates an MPE-FEC decoding operation. Due to the influence of fading and the like, an error takes place in burst data and thus, the last section may not be detected. In this case, the RF demodulator and the DVB-H physical layer demodulator are continuously operated to wait the last section, thus causing a problem that the receiver operates continuously with the maximum power.

A solution to the above problem is the use of a settable Maximum Burst Duration (MBD). That is, if a preset MBD lapses after a start time of a current burst (after calculation with a previous delta_T), the time slicing controller compulsorily determines that it is a burst end time, and commands 'OFF' to the RF demodulator and the DVB-H physical layer demodulator, but the above method also has a problem of causing power consumption during an MBD.

DISCLOSURE OF INVENTION

Technical Solution

An aspect of the present invention is to substantially solve at least the above problems and/or disadvantages and to provide at least the advantages below. Accordingly, one aspect of the present invention is to provide an apparatus and method for reducing power consumption in a Digital Video Broadcasting-Handhelds (DVB-H) system.

Another aspect of the present invention is to provide an apparatus and method for early terminating burst reception when the whole Multi Protocol Encapsulation—Forward Error Correction (MPE-FEC) frame can be restored to the former state with only data received till now because of a good reception state.

A further another aspect of the present invention is to provide an apparatus and method for early terminating burst reception even when an MPE-FEC frame cannot be normally restored to the former state although data is received until the end of a burst because of a bad reception state.

The above aspects are achieved by providing an apparatus and method for reducing power consumption in a mobile communication system.

According to one aspect of the present invention, a receive apparatus for optimizing power consumption in a mobile communication system is provided. The apparatus includes a time slicing processor. When a frame border of the last section for determining a burst reception end time is not detected during a burst reception operation, the time slicing processor receives a burst enough to restore the whole Multi Protocol Encapsulation—Forward Error Correction (MPE-FEC) frame to the former state or receives an early burst reception end request for notifying that it is impossible to restore the whole MPE-FEC frame to the former state, and terminates the burst reception process.

According to another aspect of the present invention, a time slicing processing method for optimizing power consumption in a mobile communication system is provided. The method includes, when not detecting a frame border of the last section for determining a burst reception end time during a burst reception operation, determining if receiving a burst enough to restore the whole Multi Protocol Encapsulation—Forward Error Correction (MPE-FEC) frame to the former state or receiving an early burst reception end request for notifying that it is impossible to restore the whole MPE-FEC frame to the former state and, when receiving the early burst reception end request, terminating the burst reception process.

According to a further another aspect of the present invention, a method for requesting an early burst reception end in a mobile communication system is provided. The method includes determining if detecting a table border in a section header detected upon burst reception, identifying if an MPE-FEC frame can be error corrected when detecting the table border in the section header, and performing an early burst reception end request for stopping the burst reception when identifying that the MPE-FEC frame cannot be error corrected.

BRIEF DESCRIPTION OF THE DRAWINGS

The above and other objects, features and advantages of the present invention will become more apparent from the following detailed description when taken in conjunction with the accompanying drawings in which:

FIG. 1 is a diagram illustrating conventional a data structure of a TransportStream (TS) packet in a general Digital Video Broadcasting-Handhelds (DVB-H) system;

FIG. 2 is a diagram for explaining conventional a Reed-Solomon (RS) encoding operation performed in a transmitter of a general DVB-H system;

FIG. 3 is a diagram for explaining conventional time slicing for transmitting a TS packet in a transmitter of a general DVB-H system;

FIG. 4 is a timing diagram illustrating a conventional process of processing time slicing and MultiProtocol Encapsulation-Forward Error Correction (MPE-FEC) in a receiver of a general DVB-H system;

FIG. 5 is a block diagram illustrating a construction of a receiver for optimizing power consumption according to an exemplary embodiment of the present invention;

FIG. 6 is a flow diagram illustrating an operation process of a time slicing processor according to an exemplary embodiment of the present invention;

FIG. 7 is a flow diagram illustrating an operation process of an MPE-FEC processor according to an exemplary embodiment of the present invention;

FIG. 8 is a flow diagram illustrating a process of determining an early burst reception stop in an MPE-FEC processor according to an exemplary embodiment of the present invention; and FIG. 9 is a timing diagram illustrating a process of processing time slicing and MPEFEC in a receiver according to an exemplary embodiment of the present invention.

BEST MODE FOR CARRYING OUT THE INVENTION

Preferred embodiments of the present invention will be described herein below with reference to the accompanying drawings. In the following description, well-known functions or constructions are not described in detail since they would obscure the invention in unnecessary detail.

An apparatus and method for reducing power consumption in a receiver receiving a digital broadcasting service are described below. In the following description, a so-called burst reception end request is defined as a request for stopping burst reception when a burst is received enough to restore the whole Multi Protocol Encapsulation—Forward Error Correction (MPE-FEC) frame to the former state or when a burst is received not enough to normally restore an MPE-FEC frame to the former state although data is received until the end of burst reception because of a bad reception state.

FIG. 5 is a block diagram illustrating a construction of a receiver for optimizing power consumption according to an exemplary embodiment of the present invention.

Referring to FIG. 5, the receiver can include a Radio Frequency (RF) demodulator 501, a Digital Video Broadcasting-Handhelds (DVB-H) physical layer demodulator 510, an MPE-FEC processor 520, and a time slicing processor 530. The physical layer demodulator 510 includes an Analog-to-Digital Converter (ADC) 512, an Orthogonal Frequency Division Multiplexing (OFDM) demodulator 514, and a channel decoder 516.

The RF demodulator 501 frequency-down converts a broadcast signal received through an antenna, and the ADC 512 converts the broadcast signal into a digital signal of an OFDM symbol form. The digital signal is restored to an original TransportStream (TS) packet in the OFDM demodulator 514 and the channel decoder 516.

The time slicing processor 530 commands a switching operation for receiving a TS packet including an MPE-FEC frame per predetermined burst duration, to the RF demodulator 501 and the DVB-H physical layer demodulator 510. The time slicing processor 530 controls operations of the RF demodulator 501 and the DVB-H physical layer demodulator 510 according to an exemplary embodiment of the present invention. For example, when receiving an early burst reception end signal from the MPE-FEC processor 520, the time slicing processor 530 can control operations of the RF demodulator 501 and DVB-H physical layer demodulator 510 using a control signal such as mute (i.e., power down) or shut down (i.e., power off) according to system construction.

The MPE-FEC processor 520 can include a section detector 522, an MPE-FEC frame decoder 524, and an Internet Protocol (IP) filter 526. The MPE-FEC processor 520 instructs the section detector 522 to identify delta_T information that is included in a header of each MPE section and MPE-FEC section and indicates the start of a next burst duration. The $delta_{13}$ T information can be obtained from header information of the section detected by the section detector 522. The MPE-FEC processor 520 allows the MPE-FEC frame decoder 524 to correct an error by RS decoding, by row, an MPE-FEC frame composed of the detected sections. Then, the MPE-FEC processor 520 detects an IP datagram from an error-corrected MPE-FEC frame.

FIG. 6 is a flow diagram illustrating an operation process of a time slicing processor according to an exemplary embodiment of the present invention. A description is made assuming that the receiver receives a burst by operating an RF demodulator and a physical layer demodulator according to reception operation.

Referring to FIG. 6, in step 601, the time slicing processor 530 receives a burst and then, in step 603, sets a burst reception duration as a Maximum Burst Duration (MBD).

Then, in step 605, the time slicing processor 530 determines if a section is detected. If the section is detected, in step 607, the time slicing processor 530 identifies delta_T information that represents a time at which a next burst starts after a current burst included in a header of the detected section ends and an off time duration lapses, and frame border information. Then, in step 609, the time slicing processor 530 sets the delta_T information by a burst reception counter. The delta_T information can be received from the MPE-FEC processor 520. The burst reception counter is a counter for operating the RF demodulator 501 for enabling burst reception and the physical layer demodulator 510 after the end of operations of the RF demodulator 501 and the physical layer demodulator 510. That is, the time slicing processor 530 can predict the start of next burst reception by setting a burst reception counter as the delta_T information.

After that, in step 611, the time slicing processor 530 identifies if a frame border is detected. The step 611 is a step for determining a burst reception end time by identifying a frame border of the last section of a burst.

If a frame border is detected in step 611, the time slicing processor 530 recognizes the burst reception end time and, in step 613, terminates operations of the RF demodulator 501 and the DVB-H physical layer demodulator 510. Then, in step 615, the timing slicing processor 530 determines if the burst reception counter set in step 609 is equal to a warmup time that is a time earlier by a predetermined time than a time for operating the RF demodulator 501, that is, a time designated by delta_T. If the burst reception counter is equal to the warmup time, in step 617, the time slicing processor 530 processes to operate the RF demodulator 501 and DVB-H physical layer demodulator 510 and then, processes to again perform step 601.

If a frame border is not detected in step 611, in step 619, the time slicing processor 530 identifies if an early burst reception stop is received and, if the early burst reception stop is not received, again performs section detection in step 605. If the early burst reception stop is received from the MPE-FEC processor 520, the time slicing processor 530 stops section detection in step 621 and then, proceeds to step 613.

If a section is not detected in step 605, in other words, if a frame border cannot be detected due to occurrence of an error in the last section, if the section cannot be detected due to occurrence of an error in all sections within a burst, or if all MPE-FES sections are not detected in a state where a table border is not detected upon reception of the minimum MPE section, the time slicing processor 530 determines if a counter representing an initially set MBD expires (i.e., MBD='0') in step 623.

If the MBD lapses and a burst duration counter is equal to '0', in step 613, the time slicing processor 530 compulsorily terminates burst reception and terminates operations of the RF demodulator and DVB-H physical layer demodulator.

FIG. 7 is a flow diagram illustrating an operation process of an MPE-FEC processor according to an exemplary embodiment of the present invention.

Referring to FIG. 7, in step 701, the MPE-FEC processor 520 receives a burst and, in step 703, initializes reliability information on the whole MPE-FEC frame by 'unreliable' and initializes a reliable column number ($R_r$) value and an unreliable column number ($U_r$) value.

Then, in step 705, the MPE-FEC processor 520 determines if it detects a section. If detecting the section, in step 707, the MPE-FEC processor 520 stores section data whenever detecting the section. The MPE-FEC processor 520 stores the section data while marking reliability information on its corresponding position by 'reliable'.

Then, in step 709, the MPE-FEC processor 520 determines if it detects a frame border in a section header. If detecting the frame border, in step 711, the MPE-FEC processor 520 stores data as '0' for a padding column, performs padding column process for marking reliability information by 'reliable', and performs a Reed-Solomon (RS) decoding process of decoding an MPE-FEC frame.

Then, in step 713, the MPE-FEC processor 520 detects an IP datagram by performing IP filtering for MPE-FEC frame data and then, performs a post-process and output operation.

If not detecting the frame border in step 709, in step 715, the MPE-FEC processor 520 determines if it detects a table border in a section header whenever detecting a section. If detecting the table border in the section header, in step 717, the MPE-FEC processor 520 stores the last address of a current section, thus enabling padding process for a subsequent row of a column to which the last data belongs.

Then, if the MPE-FEC processor 520 determines the execution of an early burst reception stop in step 719, in step 720, the MPE-FEC processor 520 determines if a current section is an MPE-FEC section or a table border is detected in a section header, before the execution of the early burst reception stop. This is to determine if reception for an MPE section is terminated.

If identifying that the current section is the MPE-FEC section or the table border is not detected in the section header, the MPE-FEC processor 520 performs step 705.

If identifying that the current section is the MPE-FEC section or the table border is detected in the section header, the MPE-FEC processor 520 sends a notification of the early burst reception stop to the time slicing processor 530 in step 721.

The MPE-FEC processor 520 determines if it detects a section in step 705. If not detecting the section, in step 723, the MPE-FEC processor 520 determines if burst reception during the MBD is terminated. If identifying the end of the burst reception, the MPE-FEC processor 520 performs step 713. If not identifying the end of the burst reception, the MPE-FEC processor 520 again performs step 705.

A detailed process of determining the execution of an early burst reception stop in the MPE-FEC processor 520 is described below in detail with reference to FIG. 8.

FIG. 8 is a flow diagram illustrating a process of determining an early burst reception stop in an MPE-FEC processor according to an exemplary embodiment of the present invention.

Referring to FIG. 8, when storing the last address of a current section in step 717, the MPE-FEC processor 520 identifies if a storage position of the current section is consecutive to a previous section in step 801.

If the storage position of the current section is not consecutive to the previous section, i.e., if there is a section not detected due to an error between the current section and the previous section, in step 803, the MPE-FEC processor 520 updates an unreliable column number ($U_r$) by calculating an increase of the unreliable column number ($U_r$) and then, in step 805, updates a reliable column number ($R_r$).

If the storage position of the current section is consecutive to the previous section, in step 805, the MPE-FEC processor 520 updates the reliable column number ($R_r$).

The MPE-FEC processor 520 uses function values, called a reliable column number and an unreliable column number, to determine an early burst reception stop. To calculate the function values, reliability information ($C_{x, y}$) on an $x^{th}$ column and $y^{th}$ row within an MPE-FEC frame is required. If the reliability information is equal to '1' ($C_{x, y}=1$), data of an $x^{th}$ column and $y^{th}$ row is reliable. If the reliability information is equal to '0' ($C_{x, y}=0$), the data is unreliable. Also, 'x' has a value of 0 to 254, and 'y' has a value of 0 to $N_{Row}-1$.

Assuming that $N_{ROW}$ is a row number of an MPE-FEC frame and $U_{ROW}$ is a unit of a row number for calculating '$R_r$'; and '$U_r$', the MPE-FEC processor 520 can update the unreliable column number ($U_r$) and the reliable column number ($R_r$) using Equation 1 below:

MathFigure 1

[Math. 1]

$$U_r = \sum_x U_{x,r} \text{ for } r = 0 \sim \left\lceil \frac{N_{ROW}}{U_{ROW}} \right\rceil - 1 \qquad (1)$$

$$U_{x,r} = 1 \text{ if all}$$
$$C_{x,y} = 0 \text{ for}$$
$$y = r \times U_{ROW} \sim \min \cdot ((r+1) \times U_{ROW} - 1, N_{ROW} - 1)$$
$$U_{x,r} = 0 \text{ otherwise}$$

where, $C_{x, y}$: reliability information on $x^{th}$ column and $y^{th}$ row within MPE-FEC frame, $N_{ROW}$: row number of MPE-FEC frame, and $U_{ROW}$: unit of row number for calculating $R_r$ and $U_r$.

To obtain the reliable column number ($R_r$) in the MPE-FEC processor 520, Equation 2 is given below:

MathFigure 2

[Math. 2]

-continued $$R_r = \sum_x R_{x,r} \text{ for } r = 0 \sim \left\lceil \frac{N_{ROW}}{U_{ROW}} \right\rceil - 1 \quad (2)$$

$R_{x,r} = 1$ if all $C_{x,y} = 0$ for $y = r \times U_{ROW} \sim \min\cdot((r+1) \times U_{ROW} - 1, N_{ROW} - 1)$ $R_{x,r} = 0$ otherwise where, $C_{x,y}$: reliability information on $x^{th}$ column and $y^{th}$ row within MPE-FEC frame, $N_{ROW}$: row number of MPE-FEC frame, and $U_{ROW}$: unit of row number for calculating $R_r$ and $U_r$.

When updating the reliable column number ($R_r$) and the unreliable column number ($U_r$) in the above method, in step 807, the MPE-FEC processor 520 identifies if the minimum reliable column number (Min($R_r$)) is equal to or more than '191'. If the Min($R_r$) is equal to or more than '191', it can said that '$R_r$' is equal to or more than '191' for all 'row(r)'. This means that all rows within an MPE-FEC frame can be error corrected without additional reception of burst data. Thus, in step 813, the MPE-FEC processor 520 forwards a signal for a notification of the execution of an early burst reception stop to a time slicing processor 530 and then, performs step 711 of FIG. 7.

If the Min($R_r$) is less than '191', in step 809, the MPE-FEC processor 520 determines if the minimum unreliable column number (Min($U_r$)) is equal to or more than '65'. This is to determine if all rows within an MPE-FEC frame cannot be error corrected although burst data is additionally received.

In other words, if identifying that the Min($U_r$)) is equal to or more than '65', the MPE-FEC processor 520 determines that there is a need to execute an early burst reception stop and then, performs step 720 of FIG. 7. If identifying that the Min($U_r$)) is less than '65', the MPE-FEC processor 520 determines that there is no need to execute the early burst reception stop and then, performs step 705 of FIG. 7.

FIG. 9 is a timing diagram illustrating a process of processing time slicing and MPE-FEC in a receiver according to an exemplary embodiment of the present invention.

An RF demodulator turns on at a time earlier by a warmup time of the RF demodulator from a time designated by delta_T. Next, burst data is received and a section is detected, thus constituting an MPE-FEC frame. An MPE section to be stored in an application data region and an MPE-FEC section to be stored in an RS data region are transmitted with a temporal sequence. If MPE sections included in an application data region in a left burst are all normally received, a reliable column number $R_r$=191 will be calculated. An MPE-FEC processor of the present invention will determine an early burst reception stop immediately after the end of reception of the application data region.

As described above, a DVB-H system according to an exemplary embodiment of the present invention much operates an MPE-FEC decoder compared to the conventional art, but can remarkably reduce the whole power consumption of a DVB-H receiver by minimizing an average operation time of an RF demodulator and a DVB-H physical layer demodulator. Also, the DVB-H system according to an exemplary embodiment of the present invention reduces an average operation time of a receiver, thus being capable of reducing power consumption of the receiver, because very lowering a probability of continuously operating the receiver till the maximum burst duration.

While the invention has been shown and described with reference to certain preferred embodiments thereof, it will be understood by those skilled in the art that various changes in form and details may be made therein without departing from the spirit and scope of the invention as defined by the appended claims.

The invention claimed is:

1. A receive apparatus for optimizing power consumption in a mobile communication system, the apparatus comprising:

a time slicing processor for, upon a determination that a frame border that indicates a last section of a Multi Protocol Encapsulation-Forward Error Correction (MPE-FEC) frame indicating a burst reception end time of the MPE-FEC frame is not detected during a burst reception operation corresponding to the MPE-FEC frame, receiving data that includes a burst including information sufficient to restore the entire MPE-FEC frame to a former state of a Transport Stream (TS) packet or includes an early burst reception end request indicating an inability to restore the entire MPE-FEC frame to the former state, and terminating the burst reception process upon receiving the early burst reception end request.

2. The apparatus of claim 1, wherein, upon receiving the early burst reception end request, the time slicing processor terminates a section detection process, and terminates the burst reception after terminating the section detection process.

3. The apparatus of claim 1, further comprising an MPE-FEC processor for determining, upon detecting a table border in a section header detected upon burst reception, an ability to perform forward error correction with respect to the MPE-FEC frame and, for performing, upon a determination that the MPE-FEC frame is correctable, an early burst reception end request for stopping the burst reception.

4. The apparatus of claim 3, wherein the MPE-FEC processor determines whether data sufficient for forward error correcting the MPE-FEC frame has already been received using function values that represent a reliable column number ($R_r$) and an unreliable column number ($U_r$).

5. The apparatus of claim 4, wherein the reliable column number ($R_r$) is a value for determining whether data sufficient for forward error-correcting all rows within the MPE-FEC frame has already been received.

6. The apparatus of claim 4, wherein the unreliable column number ($U_r$) is a value for determining an ability to perform forward error-correction with respect to all rows within the MPE-FEC frame upon receiving additional burst data.

7. The apparatus of claim 4, wherein the MPE-FEC processor obtains the unreliable column number ($U_r$) according to $$U_r = \sum_x U_{s,r} \text{ for } r = 0 \sim \left\lceil \frac{N_{Row}}{U_{Row}} \right\rceil - 1$$

$U_{x,r} = 1$ if all $C_{x,y} = 0$ for $y = r \times U_{ROW} \sim \min\cdot((r+1) \times U_{ROW} - 1, N_{ROW} - 1)$ $U_{x,r} = 0$ otherwise where, $C_{x,y}$: reliability information on $x^{th}$ column and $y^{th}$ row within MPE-FEC frame, N$_{ROW}$: row number of MPE-FEC frame, and
U$_{ROW}$: unit of row number for calculating R$_r$ and U$_r$.
8. The apparatus of claim 4, wherein the MPE-FEC processor obtains the reliable column number (R$_r$) according to $$U_r = \sum_x U_{s,r} \text{ for } r = 0 \sim \left\lceil \frac{N_{Row}}{U_{Row}} \right\rceil - 1$$

$U_{x,r} = 1$ if all $C_{x,y} = 0$ for $y = r \times U_{ROW} \sim \min\cdot ((r+1) \times U_{ROW} - 1, N_{ROW} - 1)$ $U_{x,r} = 0$ otherwise where,
$C_{x,y}$: reliability information on x$^{th}$ column and y$^{th}$ row within MPE-FEC frame,
N$_{ROW}$: row number of MPE-FEC frame, and
U$_{ROW}$: unit of row number for calculating R$_r$ and U$_r$.

9. A time slicing processing method for optimizing power consumption in a mobile communication system, the method comprising:
determining whether a frame border that indicates a last section of a Multi Protocol Encapsulation-Forward Error Correction (MPE-FEC) frame indicating a burst reception time of the MPE-FEC frame is detected during a burst reception operation corresponding to the MPE-FEC frame;
determining, upon a determination that the frame border indicating the last section is not received during the operation corresponding to the MPE-FEC frame, whether one selected from a group including a burst sufficient to restore the entire MPE-FEC frame to a former state and an early burst reception end request indicating an inability to restore the entire MPE-FEC frame to the former state is received; and
terminating the burst reception operation upon receiving the early burst reception end request.

10. The method of claim 9, further comprising, upon receiving the early burst reception end request, terminating a section detection process before terminating the MPE-FEC frame reception process.

11. A method for ending burst reception by a digital broadcast receiving device in a mobile communication system, the method comprising:
receiving, by a receiver, data according to a data burst reception operation corresponding to a Multi Protocol Encapsulation-Forward Error Correction (MPE-FEC) frame;
determining whether a table border in a section header is detected during the burst reception operation;
determining upon detecting the table border in the section header, whether data sufficient for forward error-correcting the MPE-FEC frame has already been received; and
performing, upon determining that data sufficient for forward error-correcting the MPE-FEC frame has not been received, an early burst reception end request for stopping the burst reception operation.

12. The method of claim 11, wherein determining whether data sufficient for forward error-correcting the MPE-FEC frame has already been received is performed using function values that represent a reliable column number (R$_r$) and an unreliable column number (U$_r$).

13. The method of claim 12, wherein the reliable column number (R$_r$) is a value for determining whether data sufficient for forward error-correcting all rows within the MPE-FEC frame has already been received.

14. The method of claim 12, wherein the unreliable column number (U$_r$) is a value for determining an ability to perform forward error correction with respect to all rows within the MPE-FEC frame upon receiving additional burst data.

15. The method of claim 14, wherein the unreliable column number (U$_r$) is obtained according to $$U_r = \sum_x U_{s,r} \text{ for } r = 0 \sim \left\lceil \frac{N_{Row}}{U_{Row}} \right\rceil - 1$$

$U_{x,r} = 1$ if all $C_{x,y} = 0$ for $y = r \times U_{ROW} \sim \min\cdot ((r+1) \times U_{ROW} - 1, N_{ROW} - 1)$ $U_{x,r} = 0$ otherwise where,
$C_{x,y}$: reliability information on x$^{th}$ column and y$^{th}$ row within MPE-FEC frame,
N$_{ROW}$: row number of MPE-FEC frame, and
U$_{ROW}$: unit of row number for calculating R$_r$ and U$_r$.

16. The method of claim 13, wherein the reliable column number (R$_r$) is obtained: according to $$U_r = \sum_x U_{s,r} \text{ for } r = 0 \sim \left\lceil \frac{N_{Row}}{U_{Row}} \right\rceil - 1$$

$U_{x,r} = 1$ if all $C_{x,y} = 0$ for $y = r \times U_{ROW} \sim \min\cdot ((r+1) \times U_{ROW} - 1, N_{ROW} - 1)$ $U_{x,r} = 0$ otherwise where,
$C_{x,y}$: reliability information on x$^{th}$ column and y$^{th}$ row within MPE-FEC frame,
N$_{ROW}$: row number of MPE-FEC frame, and
U$_{ROW}$: unit of row number for calculating R$_r$ and U$_r$.

* * * * *